United States Patent
Nayak et al.

(10) Patent No.: US 10,068,241 B2
(45) Date of Patent: Sep. 4, 2018

(54) DYNAMIC PRICING SYSTEMS AND METHODS

(71) Applicant: Wal-Mart Stores, Inc., Bentonville, AR (US)

(72) Inventors: Amaresh Nayak, Sunnyvale, CA (US); Vijay Patil, San Ramon, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 839 days.

(21) Appl. No.: 14/266,519

(22) Filed: Apr. 30, 2014

(65) Prior Publication Data

US 2015/0317659 A1 Nov. 5, 2015

(51) Int. Cl.
G06Q 30/02 (2012.01)
G06Q 10/08 (2012.01)
G06Q 50/00 (2012.01)

(52) U.S. Cl.
CPC ....... G06Q 30/0206 (2013.01); G06Q 10/087 (2013.01); *G06Q 50/01* (2013.01)

(58) Field of Classification Search
CPC ... G06Q 30/0206; G06Q 10/087; G06Q 50/01
See application file for complete search history.

(56) References Cited

U.S. PATENT DOCUMENTS

| | | | |
|---|---|---|---|
| 5,873,069 A | 2/1999 | Reuhl et al. | |
| 6,703,934 B1 | 3/2004 | Nijman et al. | |
| 7,447,646 B1 * | 11/2008 | Agarwal | G06Q 20/201 705/26.3 |
| 8,332,258 B1 * | 12/2012 | Shaw | G06Q 30/0282 702/185 |
| 8,676,632 B1 * | 3/2014 | Watson | G06Q 30/0206 705/1.1 |
| 8,738,462 B2 * | 5/2014 | Mesaros | G06Q 10/06375 705/26.2 |
| 2002/0116348 A1 * | 8/2002 | Phillips | G06Q 30/02 705/400 |
| 2003/0023500 A1 | 1/2003 | Boies et al. | |
| 2004/0172372 A1 * | 9/2004 | Wells | G06Q 20/20 705/400 |
| 2012/0016718 A1 | 1/2012 | Kahn et al. | |
| 2012/0303411 A1 * | 11/2012 | Chen | G06Q 10/087 705/7.31 |

(Continued)

FOREIGN PATENT DOCUMENTS

| | | |
|---|---|---|
| EP | 1388100 | 2/2004 |
| WO | 2014026059 | 2/2014 |

*Primary Examiner* — Sujay Koneru
(74) *Attorney, Agent, or Firm* — Bryan Cave Leighton Paisner LLP

(57) ABSTRACT

Example dynamic pricing systems and methods are described. In one implementation, a method receives an indication of an occurrence of a first event unrelated to a particular customer. The method also receives an indication of an occurrence of a second event unrelated to a particular customer. Based on the first event and the second event, the method determines whether to adjust a price associated with a particular item. If the method determines that the price associated with the particular item needs adjustment, a new price for the particular item is determined based on the first event and the second event.

20 Claims, 8 Drawing Sheets

(56) References Cited

U.S. PATENT DOCUMENTS

2013/0166355 A1* 6/2013 Mohanty ............ G06Q 30/0206
                                                      705/7.35
2015/0317659 A1* 11/2015 Nayak ................ G06Q 30/0206
                                                      705/7.35

* cited by examiner

| SEEDID | SEEDNAME | ASSIGNEDWEIGHT | ACTUALWEIGHT | SEEDTYPE | SEEDEFFECT |
|---|---|---|---|---|---|
| 1 | AVGPROFIT | 0.1 | 0.1 | STATIC | NEGATIVE |
| 2 | ORDERCHANGE | 0.1 | 0.2 | DYNAMIC | POSITIVE |
| 3 | COMPPRICE | 0.5 | 0.3 | DYNAMIC | POSITIVE |
| 4 | INVCHANGE | 0.3 | 0.2 | DYNAMIC | POSITIVE |
| 5 | SOCIALBUZZ | 0.1 | 0.2 | DYNAMIC | POSITIVE |

FIG. 8

| SEEDID | SEEDVALUEFACTOR | SKUID | SKUCATEGORY | PRICERANGEPERCENTAGE |
|---|---|---|---|---|
| 1 | 5 | WMT3456 | Electronics | 10 |
| 2 | (40/10) | WMT3456 | Electronics | 10 |
| 3 | 10 | WMT3456 | Electronics | 10 |
| 4 | (600/100) | WMT3456 | Electronics | 10 |
| 5 | (200/100) | WMT3456 | Electronics | 10 |
| 1 | 2 | WMT1023 | Groceries | 2 |
| 2 | 0 | WMT1023 | Groceries | 2 |
| 3 | 20 | WMT1023 | Groceries | 2 |
| 4 | (200/100) | WMT1023 | Groceries | 2 |

FIG. 9

DYNAMIC PRICING SYSTEMS AND METHODS

TECHNICAL FIELD

The present disclosure relates to systems and methods that support dynamic pricing of one or more items.

BACKGROUND

Dynamic pricing, or the adjustment of item pricing by retailers, is an important part of today's competitive retail environment. Contemporary price adjustment systems in use today mostly rely on periodic price adjustments that need to be done manually by designated personnel, and this process can be time-consuming and laborious. Furthermore, contemporary systems adjust pricing mostly based on competitor price adjustments. In reality, there are numerous factors that might affect pricing in real-time.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 8 represents an example of representative variables associated with the dynamic pricing algorithm.

FIG. 9 represents an example of representative variables associated with the dynamic pricing algorithm with specific items and associated item categories.

DETAILED DESCRIPTION

Figure 1:
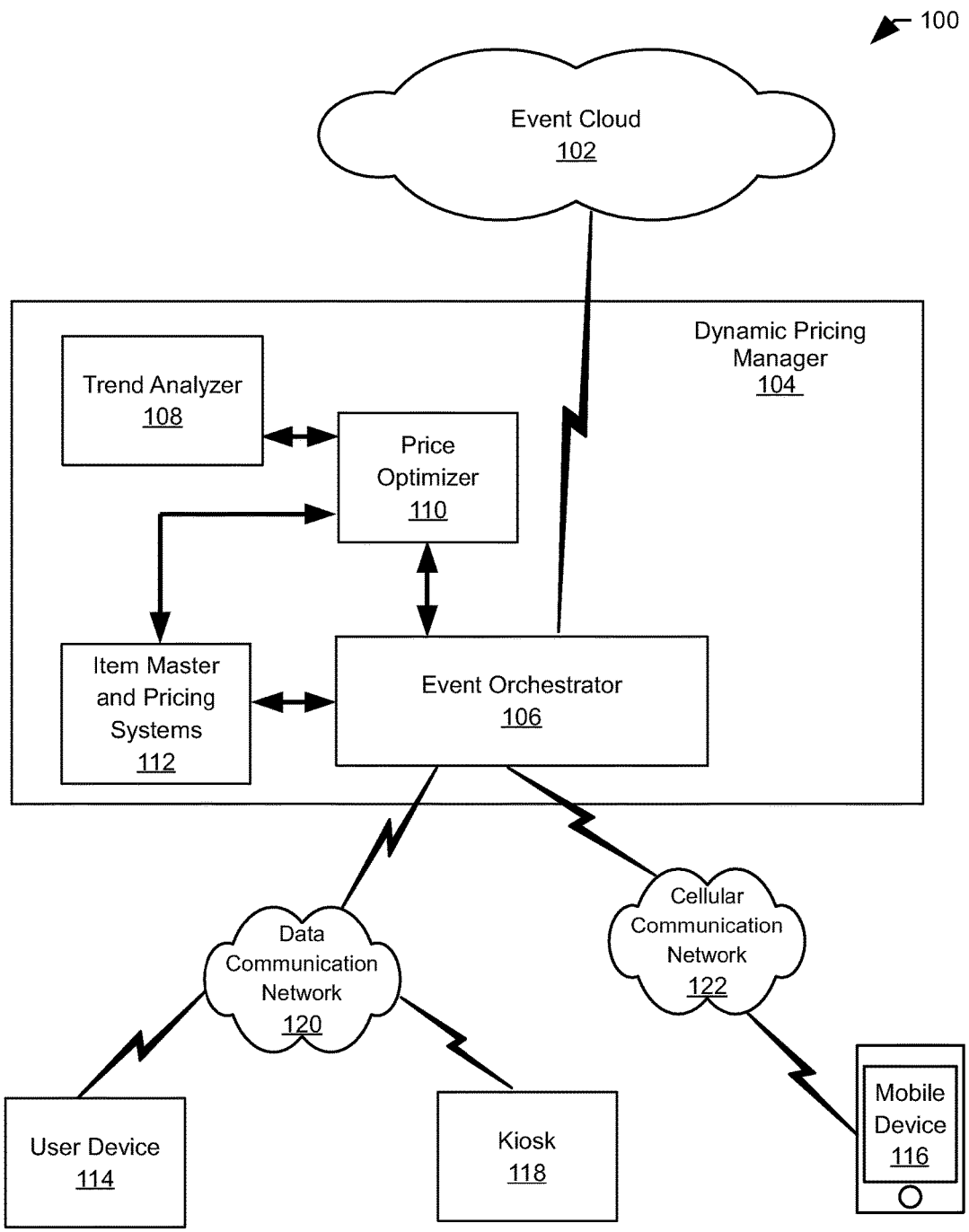
FIG. 1 is a block diagram depicting an environment within which an example embodiment may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein support dynamic pricing adjustment of items. In particular implementations, a dynamic, substantially real-time pricing system adjusts the pricing of retail items based on one or more events. The pricing adjustments can be performed automatically or manually, and the pricing system is capable of dynamically adjusting item pricing in substantially real time. As used herein, dynamic pricing refers to the changing of item pricing based on the occurrence of one or more events and not being limited to competitor pricing adjustments alone. For example, the introduction of a new model of an item by a manufacturer can be an event that causes the described dynamic pricing systems and methods to adjust the price of an older model of the item. In another example, the described systems and methods can also be triggered by the proximity of a customer to a particular store. Based on the browsing history of the customer, an alert can be sent to the mobile device of the customer if the customer is in the proximity of a store that has the item of interest in stock. Information sent to the customer can include not only the store location, but also the current price of the item, and may include a coupon or other discount for the item.

FIG. 1 is a block diagram depicting an environment 100 within which an example embodiment may be implemented. Environment 100 includes a dynamic pricing manager 104 coupled to an event cloud 102. The event cloud 102 stores multiple event adapters that identify the occurrence of a variety of different events. The event cloud 102 may identify any number of different events and information, such as customer profile information, transaction history data, location information (e.g., proximity to a physical store), geographic data, social media data, item information, related products, items purchased, total purchase data, inventory levels, item markdowns, supply chain events, and the like.

In one embodiment of the system, events can be added or removed from the list of events based on need, where the list of events need not be rigidly predefined. Introduction or removal of factors associated with the item determine addition or removal of a particular event. For example, if a product is sold exclusively by the vendor, the factor of competitor price doesn't exist. But, if other online retailers start selling the item, then a new factor is introduced—competitor price—which triggers the addition of a competitor price event. In some embodiments, addition of the event leads to:

1. A merchandiser assigning a certain weight to the event, or
2. Allow the event to be populated with an initial value from a pre-defined category list (dynamic).

As an example of dynamic population, an electronics category has a pre-defined variable list from which the parameters are inherited for all items falling in the category. Taking the above example, if a competitor price does not exist, a zero value is assigned to the competitor price parameter in the corresponding list for that item. When the crawler program for competitor price initiates this new event, it assigns the pre-defined category parameter to the item and decreases other parameters (e.g., round to a factor of 1 for all parameter weightings).

The dynamic pricing manager 104 further includes an event orchestrator 106, a trend analyzer 108, a price optimizer 110 and item master and pricing systems 112. The event orchestrator 106 receives event changes from the event cloud 102 and triggers the price optimizer 110. The price optimizer 110 calculates the revised item price based on event changes received from the event orchestrator 106 and transmits back the revised price to the event orchestrator 106. In some situations, one or more events may occur that do not cause a revision in the price of an item. The price optimizer 110 also transmits the revised price to the item master and pricing systems 112, where the price of the particular item is updated if necessary, either automatically or manually, as often as required. The trend analyzer 108 analyzes historical trends of order changes based on multiple variables (for example, average profit, order change, inventory change, social buzz, competitor price change, page hit changes, shipping cost changes, cost of goods changes, and promotional event changes) and input from the price optimizer 110. The trend analyzer 108 is also able to modify these variables used to analyze the historical trends of order changes. In this sense, these variables associated with the trend analyzer 108 are self-correcting.

The dynamic pricing manager 104, and specifically the event orchestrator 106, is further coupled to a data communication network 120, such as the Internet, and a cellular communication network 122. The event orchestrator 106 can communicate with a mobile device 116, via the cellular communication network 122. The event orchestrator can also communicate, via the data communication network 120, with a user device 114 and a kiosk 118. The user device 114, mobile device 116 and kiosk 118 represent interfaces that allow the dynamic pricing manager to interact with a customer. Although one user device 114, one mobile device 116 and one kiosk 118 are shown in FIG. 1, particular embodiments may include any number of user devices, mobile devices and kiosks communicating with the dynamic pricing manager 104, specifically the event orchestrator 106, through the data communication network 120 and/or the cellular communication network 122. In some embodiments, the kiosk 118 is an in-store kiosk including a computing device that allows users to access item pricing and other information while shopping in the store.

Figure 2:
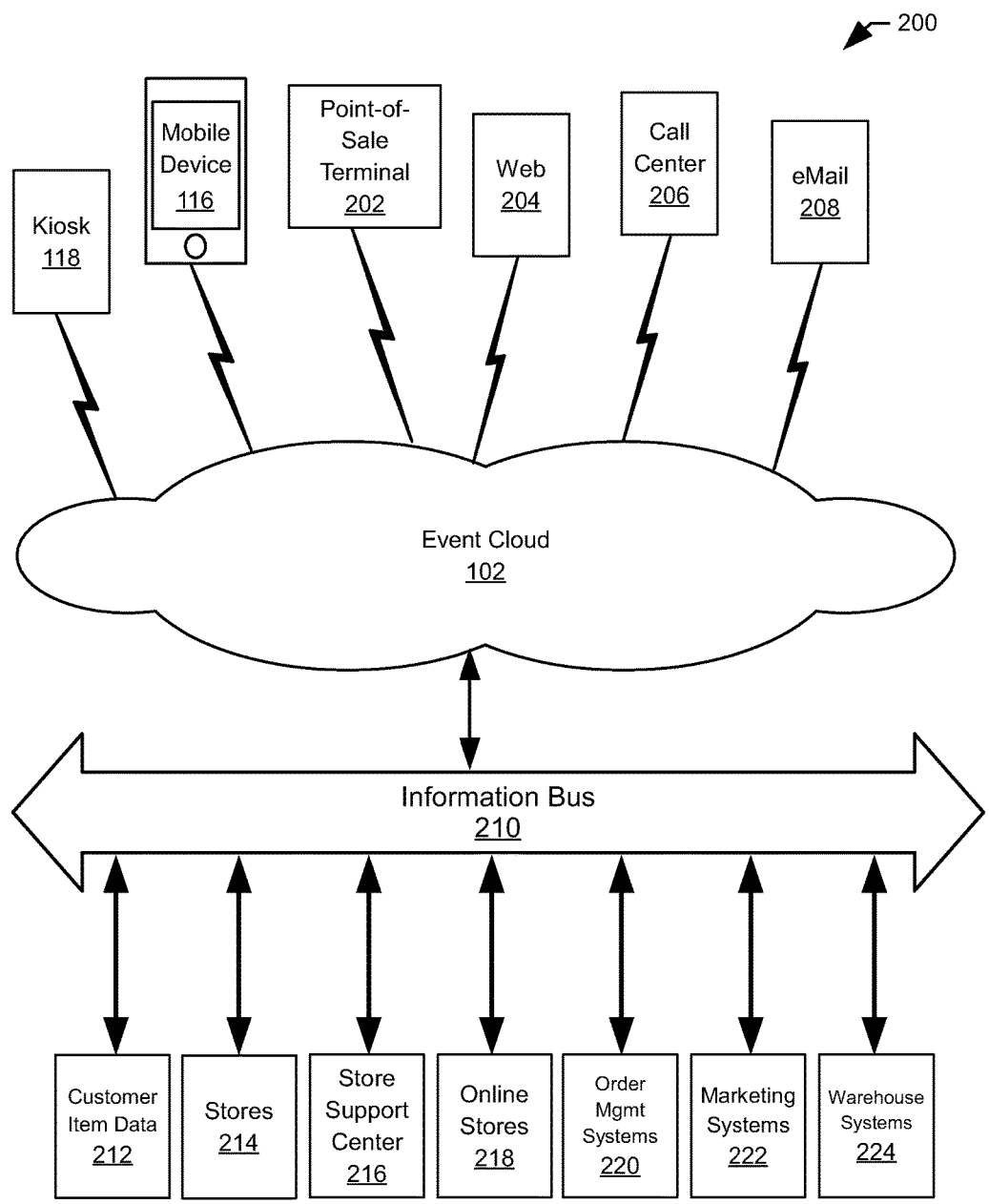
FIG. 2 is a block diagram depicting an embodiment of a structure for managing events in a dynamic pricing system.

FIG. 2 is a block diagram depicting an embodiment of a structure for managing events in the dynamic pricing system. In this embodiment, the event cloud 102 receives inputs from multiple information sources including a kiosk 118, a mobile device 116, a point-of-sale terminal 202, the worldwide web 204, a call center 206 and email 208. Collectively these information sources connect to the event cloud 102. Although one kiosk 118, one mobile device 116, one point-of-sale terminal 202, one call center 206 and one email source 208 are shown in FIG. 2, particular embodiments may include any number of kiosks, mobile devices, point-of-sale terminals, call centers and email sources communicating with the event cloud 102. The event cloud transmits the data received from kiosk 118, mobile device 116, the point-of-sale terminal 202, the world-wide web 204, the call center 206 and the email source 208 to an information bus 210. The event cloud 102 also receives data from the information bus 210. The information bus 210 is also connected to multiple other data sources including customer item data 212, stores 214, store support center 216, online stores 218, order management systems 220, marketing systems 222, and warehouse systems 224, that send additional information to and receive additional data from the information bus 210. Examples of the different types of data generated and communicated to and from the information bus 210 by each of the illustrated systems or devices connected to the information bus are as follows.

Kiosk 118—Example Data: number of item views, number of orders placed for that item.

Mobile device 116—Example Data: number of item views, number of orders placed for the item, numerical distance—store proximity.

Point-of-sale terminal 202—Example Data: number of orders for the item, a number of returns for the item.

Web 204—Example Data: Social buzz like Facebook likes or dislikes, Competitor price.

Call center 206—Example Data: number of call-in orders for the item or item returns.

Email 208—Example Data: number of item recommendations by email reviews for the item.

Customer item data 212—Example Data: Profit margin, Price updates, number of days for item expiry on site for the item.

Stores 214—Example Data: percentage increase/decrease in store inventory.

Store support center 216—Example Data: store returns.

Online stores 218—Example Data: number of item views or category views, addition to carts, cart abandonments.

Order management systems 220—Example Data: number of orders for the item, inventory changes for the item.

Marketing systems 222—Example Data: Email views and reviews of the item of marketing campaigns.

Warehouse systems 224—Example Data: item movement to distribution centers which forecasts changes to inventory.

Figure 3:
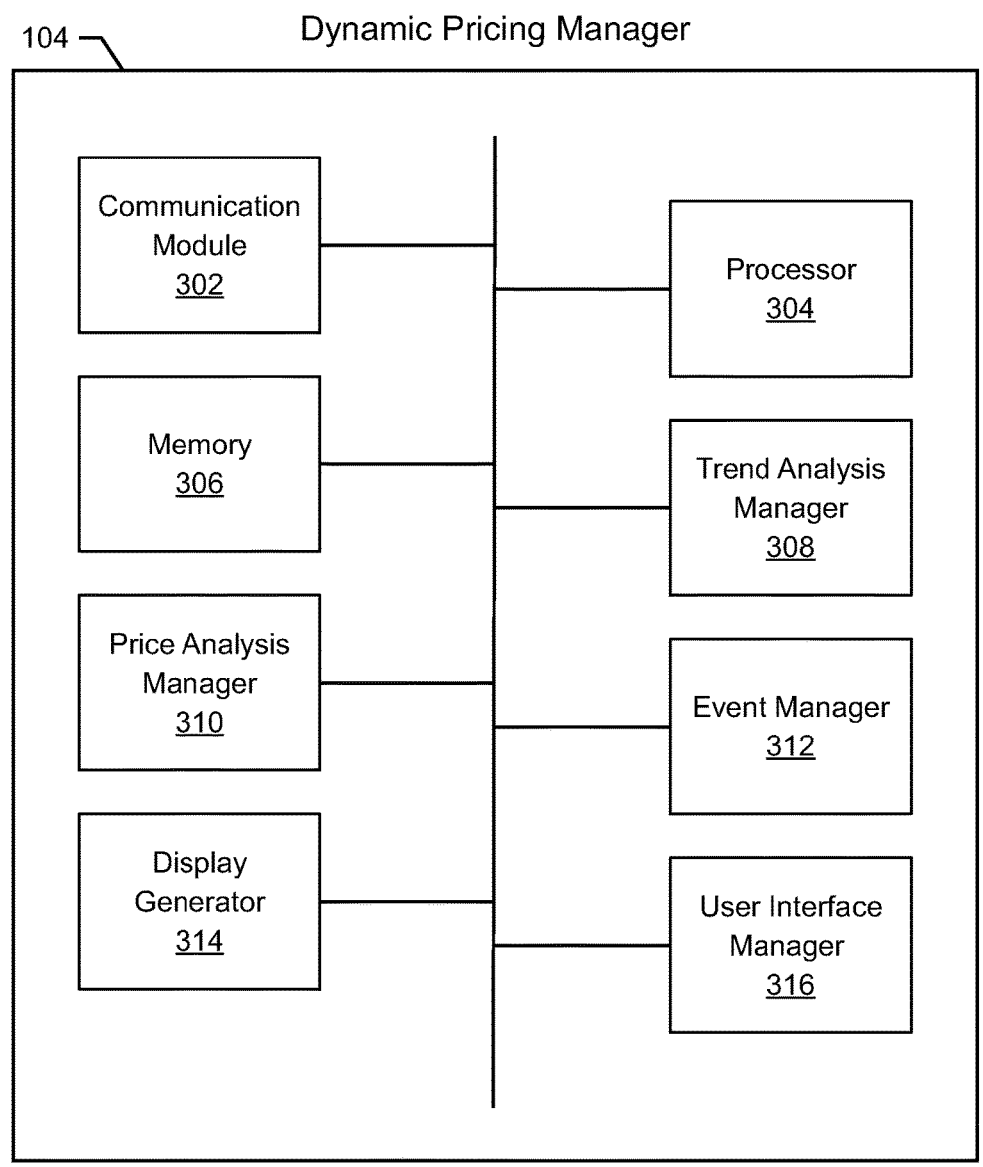
FIG. 3 is a block diagram depicting an example embodiment of a dynamic pricing manager.

FIG. 3 is a block diagram depicting an embodiment of a dynamic pricing manager 104. Dynamic pricing manager 104 includes a communication module 302, a processor 304, and a memory 306. Communication module 302 allows dynamic pricing manager 104 to communicate with other systems such as event cloud 102, user device 114 and kiosk 118 via data communication network 120, and mobile device 116 via cellular communication network 122. Processor 304 executes various instructions to implement the functionality provided by dynamic pricing manager 104. Memory 306 stores these instructions as well as other data used by processor 304 and other modules contained in dynamic pricing manager 104.

Dynamic pricing manager 104 also includes a trend analysis manager 308 that analyzes historical trends of order changes based on multiple variables and changes multiple parameters if necessary. The different types of data received from any combination of kiosk 118, mobile device 116, point-of-sale terminal 202, web 204, call center 206, email 208, customer item data 212, stores 214, store support center 216, online stores 218, order management systems 220, marketing systems 222 and warehouse systems 224 are considered as multiple variables. For example, drop-in item orders or customer views—online/kiosk—would trigger a factored increase in parameter values for positive parameters and a factored decrease in parameter values that would result a corresponding price decrease for the item.

A price analysis manager 310 performs the computation to determine revised item price and transmits the revised item price to the event manager 312. The event manager 312 is also performs the function of identifying events from event cloud 102 and subsequently triggering the price analysis manager 310 to perform computations for revised item pricing. The display generator 314 generates display data to be presented to a user or to be stored for future presentation to the user. For example, the display generator can generate a search results listing for presentation to the user. The user interface manager 316 generates user interface components that allow the dynamic pricing manager 104 and other components of the system to present user interface components to one or more users.

Figure 4:
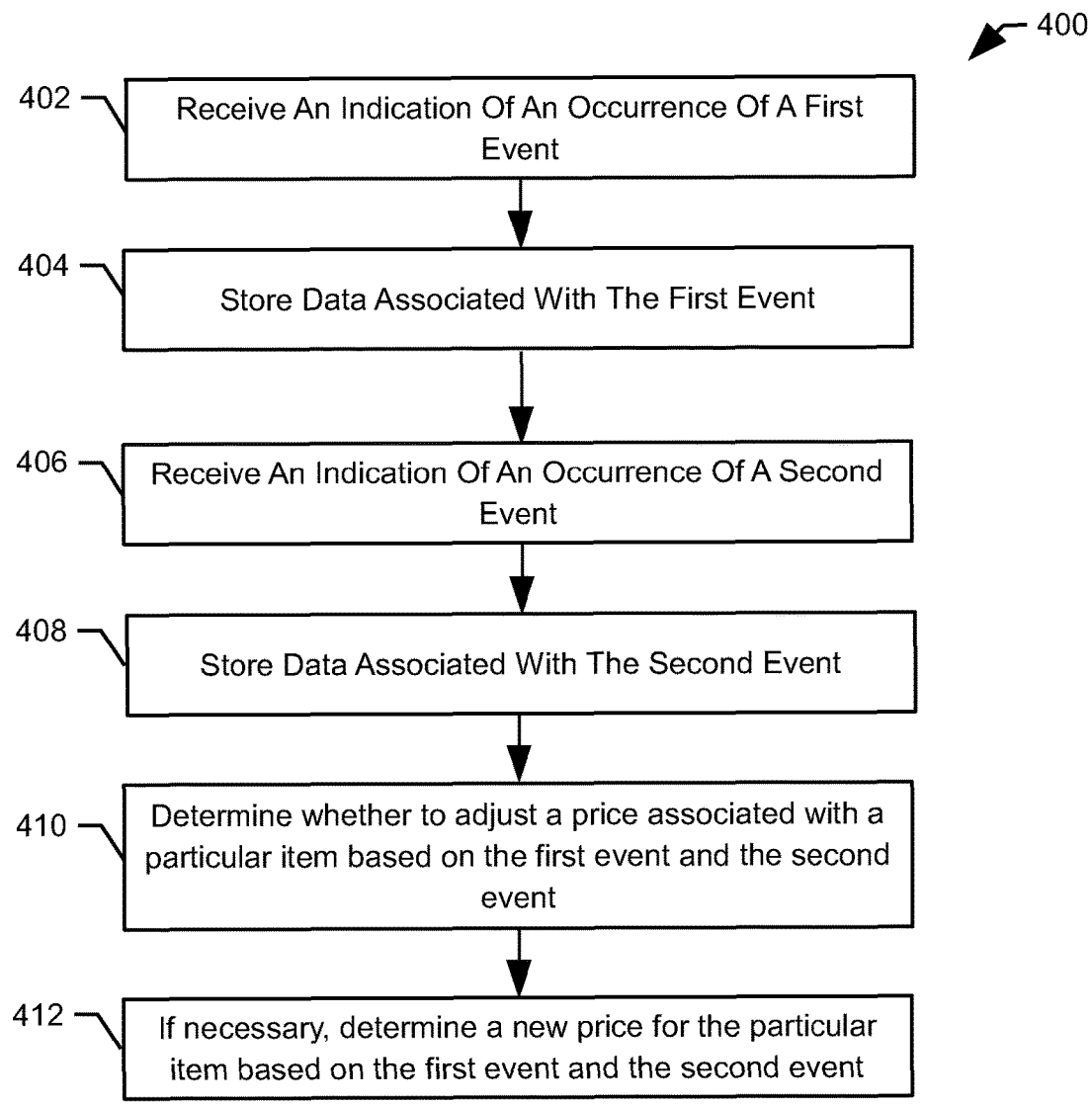
FIG. 4 represents a flow diagram depicting an embodiment of a method for monitoring and capturing event data.

FIG. 4 represents a flow diagram depicting an embodiment of a method 400 for monitoring and capturing event data. Initially, the system receives an indication of an occurrence of a first event at 402, for example a seasonal event. The system then stores the data associated with the first event at 404. The system then receives an indication of an occurrence of a second event at 406, for example social buzz related to a particular item. The system then stores the data associated with the second event at 408. Based on the first event and the second event, the system determines whether to adjust a price associated with a particular item at 410. If necessary, the system determines a new price for the particular item based on the first event and the second event at 412. The weighted seed algorithm discussed below is a specific example of determining whether to adjust an item price based on one or more events.

Figure 5:
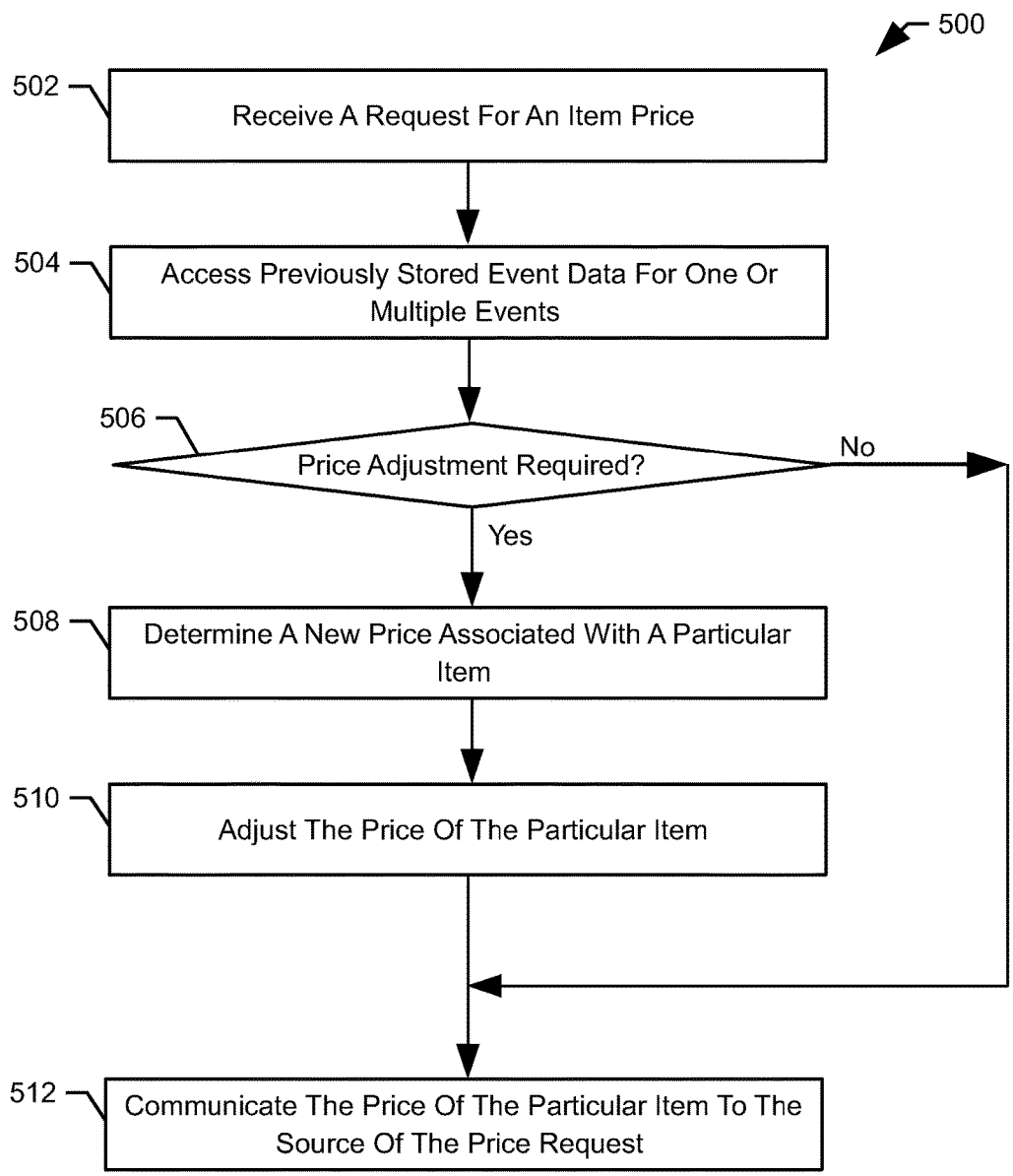
FIG. 5 represents a flow diagram depicting an embodiment of a method for determining whether to adjust the price of an item.

FIG. 5 represents a flow diagram depicting an embodiment of a method 500 for determining whether to adjust the price of an item. For example, a customer may request the price of a seasonal item at some point. Initially, the system receives a request for an item price at 502. The system then accesses previously stored event data for one or multiple events at 504. Then, the system determines whether a price adjustment is required at 506. If a price adjustment is required, the system determines a new price associated with a particular item at 508, adjusts the price of the particular item at 510, and then communicates the price of the particular item to the source of the price request at 512. If it is determined that a price adjustment is not required at 506, the system directly communicates the price of the particular item to the source of the price request at 512.

Figure 6:
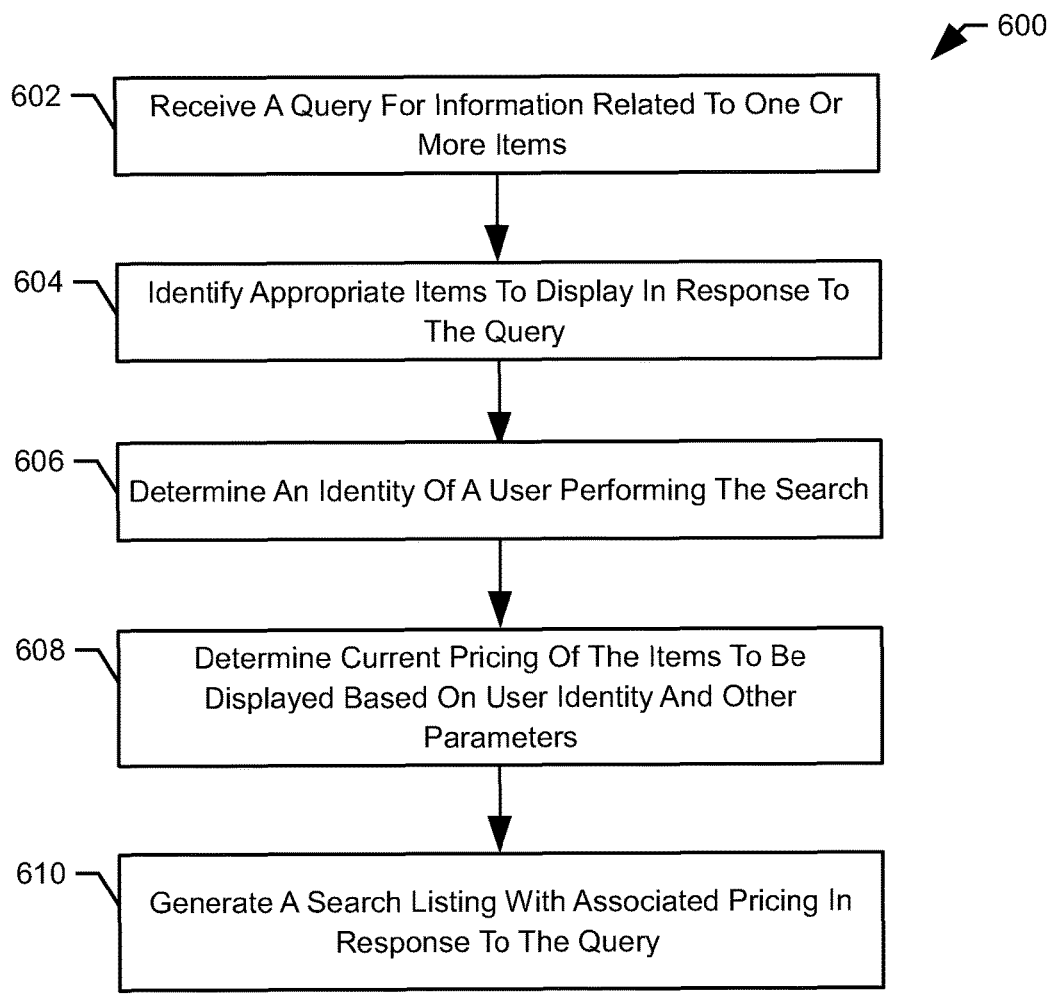
FIG. 6 represents a flow diagram depicting an embodiment of a method for generating a search listing in response to a query.

FIG. 6 represents a flow diagram depicting an embodiment of a method 600 for generating a search listing in response to a query. In this embodiment, the system receives a query for information related to one or more items at 602. The system then identifies appropriate items to display in response to the query at 604. Next, the system determines an identity of a user performing the search at 606, and determines current pricing of the items to be displayed based on the user identity and other parameters at 608. The other parameters at 608 include, for example:

1. User loyalty (based on shopping behavior, such as past orders on a web site).
2. User device (such as a mobile device and a corresponding proximity to a physical retail store).
3. User returns (such as a number of times the user has returned previously purchased items).
4. User interests (which category of items a user views and shops most on web site, in stores or using kiosks).

Finally, the system generates a search listing with associated pricing information in response to the query at 610. This search listing may be presented to a user, stored for later retrieval or communicated to another system for device for processing.

Figure 7:
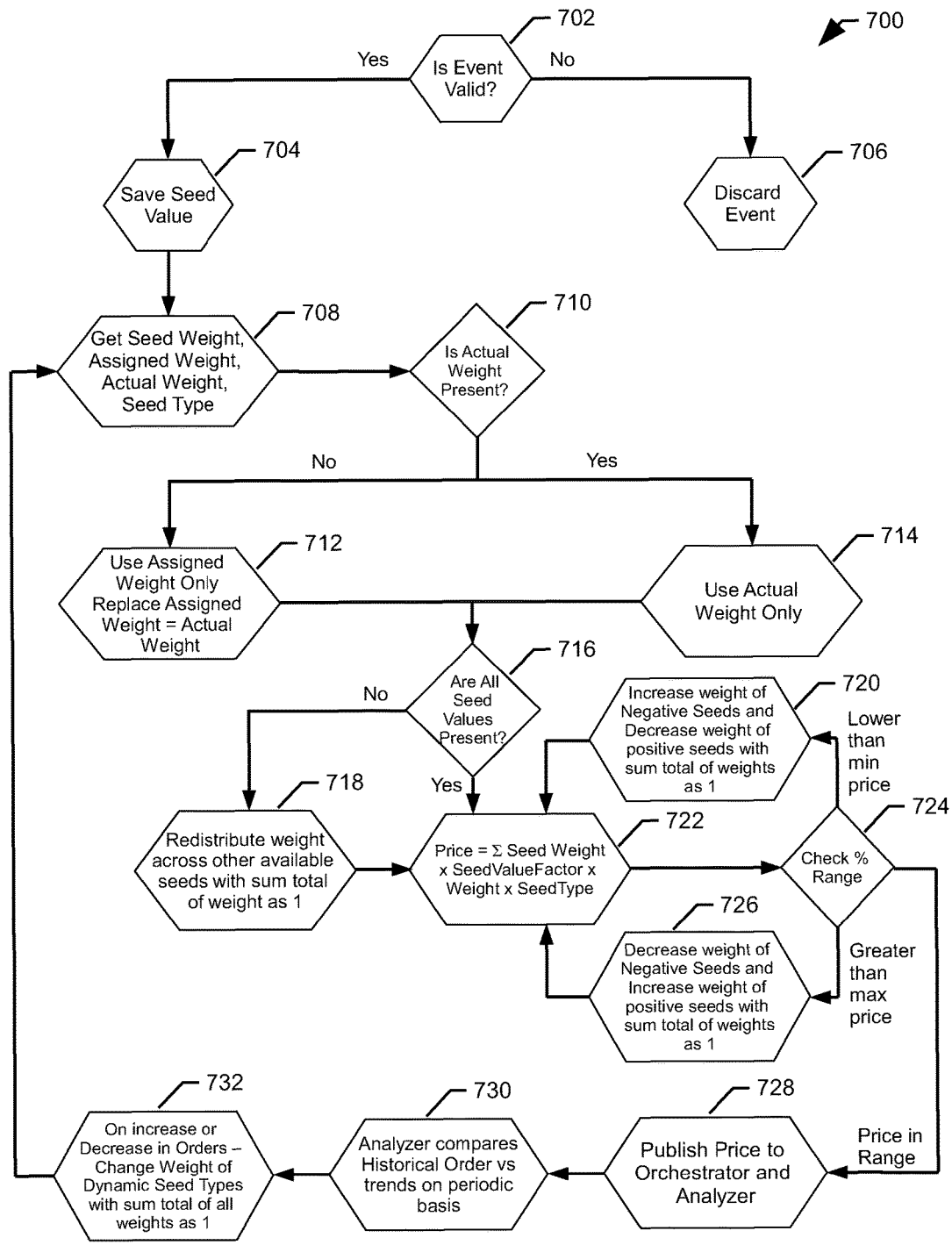
FIG. 7 represents a flow diagram depicting an embodiment of a dynamic pricing algorithm.

FIG. 7 is a flow diagram depicting an embodiment of a dynamic pricing algorithm 700, referred to as the weighted seed algorithm. The following variables and parameters are associated with this algorithm.

SEED: A Seed is identified as a distinct event or combination of distinct events that can be added dynamically as an event adapter to the event cloud 102. It consists of a numeric identifier and a character event name.

SEEDVALUEFACTOR: The change in value of the SEED for the corresponding Stock Keeping Unit (SKU) divided by a numeric factor. For example, Inventory Changes has a factor of 100 while Profit has a factor of 1.

ASSIGNED WEIGHT: The weight defines the factor for particular SEED to affect the price of an item. Higher the seed weight greater the variance in the price changes for SEEDVALUE changes. This is the initial assigned weight to the SEED by the merchandiser.

ACTUAL WEIGHT: Based on trend analyzer 108, the weight changes dynamically. It allows for better pricing changes based on order/demand trends. This is the weight factor considered for every subsequent event.

SEEDTYPE: STATIC or DYNAMIC. Static Seed weights are constant and can be changed by the merchandiser through a graphical user interface (GUI). Dynamic Seed weights can be changed by trend analyzer 108 based on order trends.

SEEDEFFECT: This is the effect the SEED has on pricing. It can have a POSITIVE effect or a NEGATIVE effect. A POSTIVE effect decreases the price whereas a NEGATIVE effect increases the price. For example, positive inventory changes, such as inventory additions, are a POSTIVE SEED type and PROFIT is a NEGATIVE seed type. This allows for changes to price without sacrificing profit.

PRICERANGEPERCENTAGE: This is +/−percent based on the item value defined by merchandiser. For example, price range % of 5, will restrict the price changes to +/−5% of the merchandiser price.

As seen in FIG. 7, a dynamic pricing algorithm 700 initially determines whether an event is valid at 702. If the event is not valid, the dynamic pricing algorithm 700 discards the event at 706. If the event is valid, the seed value associated with the event is saved at 704. The dynamic pricing algorithm 700 then gets the seed weight, assigned weight, actual weight and the seed type at 708. The next step in the dynamic pricing algorithm 700 determines whether the actual weight is present at 710. If the actual weight is not present, the dynamic pricing algorithm 700 uses the assigned weight only, and replaces the assigned weight by the actual weight at 712. If the actual weight is present, the dynamic pricing algorithm 700 uses the actual weight only at 714. Next, the dynamic pricing algorithm 700 decides whether all seed values are present at 716. If all the seed values are not present, the dynamic pricing algorithm 700 redistributes weight across other available seeds with sum total of all weights as 1 at 718, and then proceeds to compute the price based on the formula at 722:

$$Price = \Sigma Seed\ Weight \times SeedValueFactor \times Weight \times SeedType$$

If the dynamic pricing algorithm 700 determines that all seeds are present, the algorithm directly computes the price based on the formula at 722. The dynamic pricing algorithm 700 then checks the percentage range at 724. If the percentage range is lower than the minimum price, the dynamic pricing algorithm 700 increases the weight of the negative seeds and decreases the weight of the positive seeds with sum total of weights as 1 at 720, and then re-computes the price at 722. If the percentage range is higher than the minimum price, the dynamic pricing algorithm 700 decreases the weight of the negative seeds and increases the weight of the positive seeds with sum total of weights as 1 at 726, and then re-computes the price at 722. If the percentage range is in range at 724, the price is published to the orchestrator and analyzer at 728. The analyzer compares historical order versus trends on a periodic basis at 730. Based on an increase or decrease on orders, the dynamic pricing algorithm 700 changes the weights of dynamic seed types with a sum total of all weights as 1 at 732. The dynamic pricing algorithm 700 then returns to get the seed weight, assigned weight, actual weight and seed type at 708, and the process repeats.

FIG. 8 shows a list of five example seed variables. As seen in the figure, the seed AVGPROFIT (average profit) is defined as static and negative. In some embodiments, only the merchandiser can change the seeded weight and it has a negative effect on price decrease. All other seeds shown in FIG. 8 have a positive effect on price decrease and their seeded weight can be changed by trend analyzer 108.

FIG. 9 shows an example listing of how seeds are associated with items (SKU) and item category (SKU category). As seen in the FIG. 9, the SKU category of Electronics can have a price change range of +/−10% of the merchandiser price. The event orchestrator 106 feeds different seed values (factored) to item SKUID WMT3456. A seed value of zero or null indicates the associated seed weight is not applied. If a seed weight is not applied, the weight of that seed is distributed across other available seeds. In the example below, the weight of order change is distributed across the other three available seeds for item WMT1023. The price range percentage is on category level/SKU level to restrict the price changes on a macro (category) or a micro (item) view.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method being implemented at a computer system comprising computer instructions configured to run at one or more processors and configured to be stored at one or more non-transitory memory storage modules, the method comprising:

receiving, with a dynamic pricing manager, a notification of an occurrence of an event, via a computer network, unrelated to a particular customer;

determining, with the dynamic pricing manager, whether the event is a valid event, based on a dynamic pricing algorithm comprising a seed, a seed weight, a seedvaluefactor, a weight, and a seed type;

performing, with the dynamic pricing manager, one or more event-dependent and item-dependent price normalizations for one or more items based on the event;

upon determining that the event is the valid event, with the dynamic pricing manager, and upon determining that all seeds are present, computing one or more prices of the one or more items based on a formula as expressed:

$$Price = \Sigma Seed\ Weight \times SeedValueFactor \times Weight \times SeedType;$$

determining, with the dynamic pricing manager, whether to adjust the one or more prices by one or more price adjustments based on limits related to one or more maximum allowable prices for the one or more items and one or more minimum allowable prices for the one or more items;

receiving, with the dynamic pricing manager and from a computing device of a user, a user request during one or more browsing sessions searching a website of a retailer for the one or more prices of the one or more items;

generating, with the dynamic pricing manager, a search listing with the one or more items related to the user request for display on the computing device of the user during the one or more browsing sessions on the website of the retailer;

revising, with the dynamic pricing manager, the one or more prices for the one or more items in the search listing, based on the one or more price adjustments, as determined, for display on the computing device of the user during the one or more browsing sessions for an item on the website of the retailer;

determining, with the dynamic pricing manager, based on a browsing history of the user on the website of the retailer, a physical proximity of the user to a location of a brick and mortar store of the retailer, wherein the browsing history of the user is based on the one or more browsing sessions; and when the one or more items are in stock at the location of the brick and mortar store and when the physical proximity of the user to the location of the brick and mortar store of the retailer is within a pre-determined distance, transmitting an alert to a graphical user interface of a mobile device of the user comprising the location of the brick and mortar store of the retailer, the one or more prices of the one or more items, and one or more discounts for the one or more items.

2. The method of claim 1, further comprising:
performing, with the dynamic pricing manager, the one or more event-dependent and item-dependent price normalizations based on modified normalization parameters based on a pricing history analysis to determine one or more new prices for the one or more items based on the event.

3. The method of claim 1, wherein:
performing the one or more event-dependent and item-dependent price normalizations further comprises determining parameter weighting routines for the one or more items.

4. The method of claim 1, wherein the event comprises at least one of:
a browsing session;
a social media post;
an inventory change;
a shipping cost change;
a competitor price change;
a plurality of new orders;
a plurality of new orders placed for related items;
a promotional event;
a proximity of a user to a physical retail store; or
a vendor supply change.

5. The method of claim 1, wherein revising the one or more prices comprises identifying one or more ranges of acceptable prices for the one or more items.

6. The method of claim 5, wherein the one or more ranges of acceptable prices is determined by one or more vendors of the one or more items.

7. The method of claim 1, wherein the event is unrelated to a product price.

8. The method of claim 1, wherein revising the one or more prices is independent of competitor price variations for the one or more items.

9. The method of claim 1, further comprising:
storing the one or more prices, with the dynamic pricing manager, as revised, for the one or more items for presentation to a plurality of users.

10. The method of claim 1, wherein the dynamic pricing algorithm further comprises:
the seed identified as a distinct event or combination of distinct events;
the seed weight comprising factors for the seed that affect a price of a first item;
the weight comprising an actual weight based on an order or demand trend or, when the actual weight is not present, an assigned weight, assigned by a retailer, that defines a factor for the seed to affect the price of the first item is substituted in the dynamic pricing algorithm;
the seedvaluefactor is change in value of the seed for a corresponding Stock Keeping Unit (SKU) divided by changes in inventory; and
the seed type that can be either (a) static where the weight is constant or (b) dynamic where the weight can be changed based on the order or demand trend.

11. A system comprising:
one or more processors;
one or more non-transitory memory storage modules; and
computer instructions configured to run at the one or more processors and configured to be stored at the one or more non-transitory memory storage modules to perform acts of:
receiving a notification of an occurrence of an event, via a computer network, unrelated to a particular customer;
determining whether the event is a valid event, based on a dynamic pricing algorithm comprising a seed, a seed weight, a seedvaluefactor, a weight, and a seed type;
performing one or more event-dependent and item-dependent price normalizations for one or more items based on the event;
upon determining that the event is the valid event and upon determining that all seeds are present, computing one or more prices of the one or more items based on a formula as expressed:

Price=ΣSeed Weight×SeedValueFactor×Weight×Seed Type;

determining whether to adjust the one or more prices by one or more price adjustments based on limits related to one or more maximum allowable prices for the one or more items and one or more minimum allowable prices for the one or more items;
receiving from a computing device of a user, a user request during one or more browsing sessions searching a website of a retailer for the one or more prices of the one or more items;
generating a search listing with the one or more items related to the user request for display on the computing device of the user during the one or more browsing sessions on the website of the retailer;
revising the one or more prices for the one or more items in the search listing, based on the one or more price adjustments, as determined, for display on the computing device of the user during the one or more browsing sessions for an item on the website of the retailer;
determining based on a browsing history of the user on the website of the retailer, a physical proximity of the user to a location of a brick and mortar store of the retailer, wherein the browsing history of the user is based on the one or more browsing sessions; and when the one or more items are in stock at the location of the brick and mortar store and when the physical proximity of the user to the location of the brick and mortar store of the retailer is within a pre-determined distance, transmitting an alert to a graphical user interface of a mobile device of the user comprising the location of the brick and mortar store of the retailer, the one or more prices of the one or more items, and one or more discounts for the one or more items.

12. The system of claim 11, wherein the computer instructions are further configured to perform acts of:

performing the one or more event-dependent and item-dependent price normalization based on modified normalizations parameters based on a pricing history analysis to determine one or more new prices for the one or more items based on the event.

13. The system of claim 11, wherein the computer instructions are further configured to perform acts of:

performing the one or more event-dependent and item-dependent price normalizations further comprises determining parameter weighting routines for the one or more items.

14. The system of claim 11, wherein the event comprises at least one of:

a browsing session;
a social media post;
an inventory change;
a shipping cost change;
a competitor price change;
a plurality of new orders;
a plurality of new orders placed for related items;
a promotional event;
a proximity of a user to a physical retail store; or
a vendor supply change.

15. The system of claim 11, wherein revising the one or more prices comprises identifying one or more ranges of acceptable prices for the one or more items.

16. The system of claim 15, wherein the one or more ranges of acceptable prices is determined by one or more vendors of the one or more items.

17. The system of claim 11, wherein the event is unrelated to a product price.

18. The system of claim 11, wherein revising the one or more prices is independent of competitor price variations for the one or more items.

19. The system of claim 11, wherein the computer instructions are further configured to perform acts of:

storing the one or more prices, as revised, for the one or more items for presentation to a plurality of users.

20. The system of claim 11, wherein the dynamic pricing algorithm further comprises:

the seed identified as a distinct event or combination of distinct events;

the seed weight comprising factors for the seed that affect a price of a first item;

the weight comprising an actual weight based on an order or demand trend or, when the actual weight is not present, an assigned weight, assigned by a retailer, that defines a factor for the seed to affect the price of the first item is substituted in the dynamic pricing algorithm;

the seedvaluefactor is change in value of the seed for a corresponding Stock Keeping Unit (SKU) divided by changes in inventory; and the seed type that can be either (a) static where the weight is constant or (b) dynamic where the weight can be changed based on the order or demand trend.

* * * * *